May 24, 1960    A. C. SUBACH ET AL    2,937,447
ANGLE MEASURING SCREEN
Filed Nov. 8, 1957      4 Sheets-Sheet 1
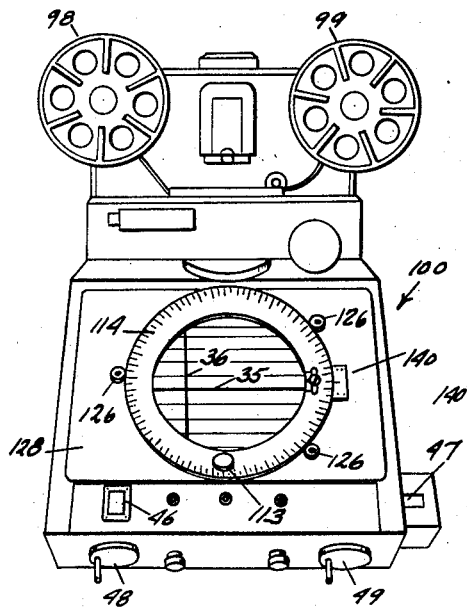
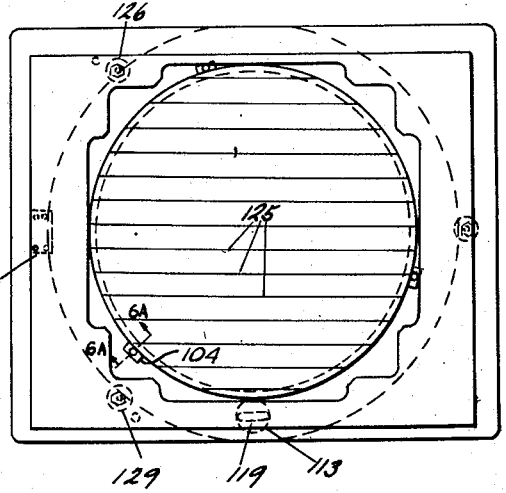
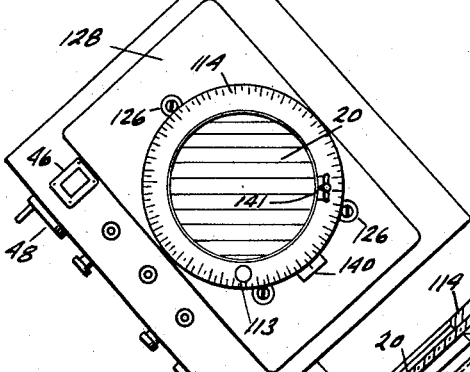
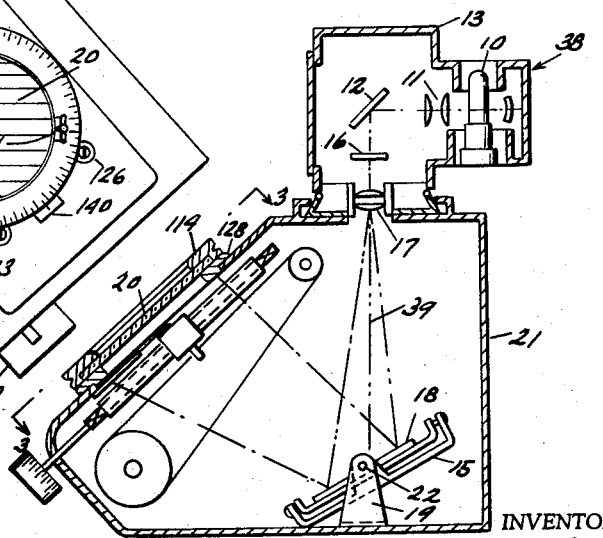
INVENTORS
ALBERT C. SUBACH
HOWARD B. BETTS
BY
ATTORNEYS May 24, 1960 A. C. SUBACH ET AL 2,937,447
ANGLE MEASURING SCREEN
Filed Nov. 8, 1957 4 Sheets-Sheet 2

INVENTORS
ALBERT C. SUBACH
HOWARD B. BETTS
BY Ostrolenk, Faber,
Gerb & Soffen
ATTORNEYS May 24, 1960
A. C. SUBACH ET AL
2,937,447
ANGLE MEASURING SCREEN
Filed Nov. 8, 1957
4 Sheets-Sheet 3
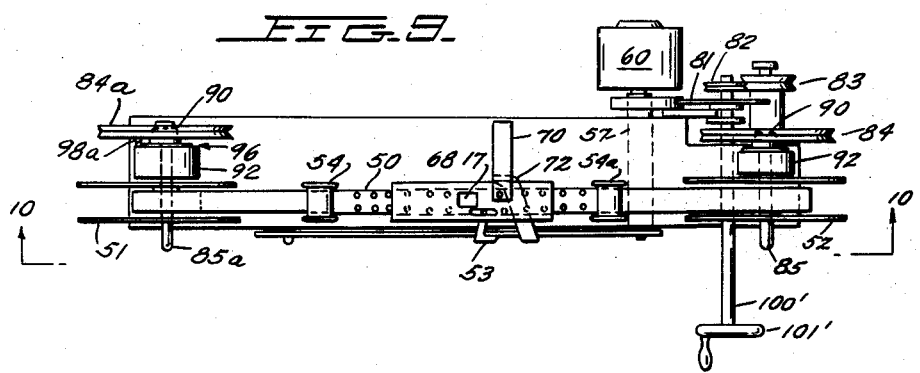
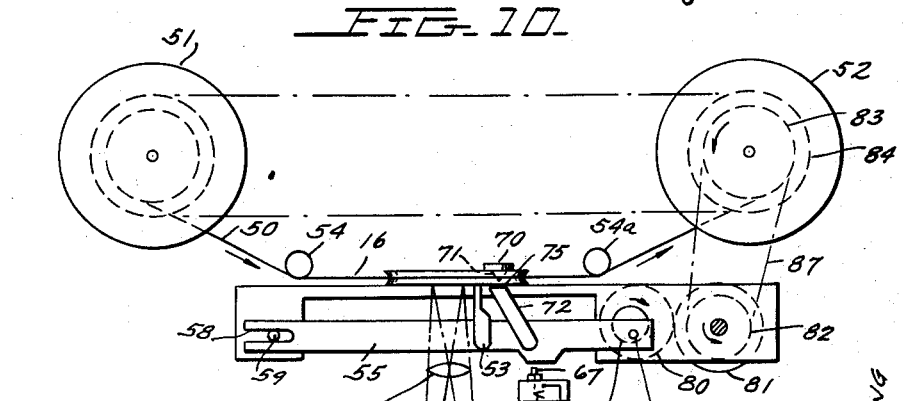
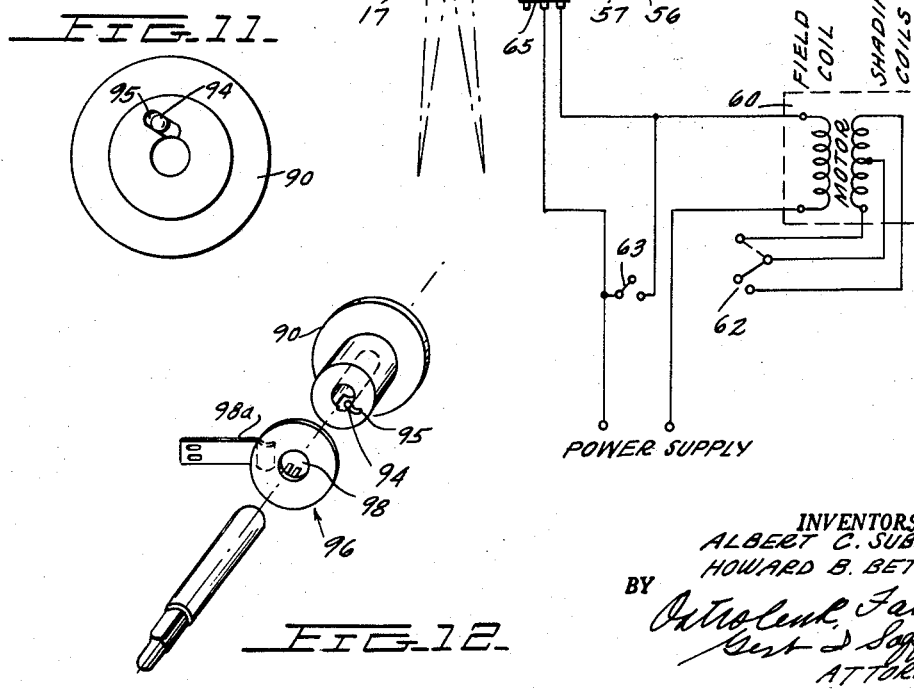
INVENTORS
ALBERT C. SUBACH
HOWARD B. BETTS
BY
ATTORNEYS May 24, 1960
A. C. SUBACH ET AL
2,937,447
ANGLE MEASURING SCREEN
Filed Nov. 8, 1957
4 Sheets-Sheet 4
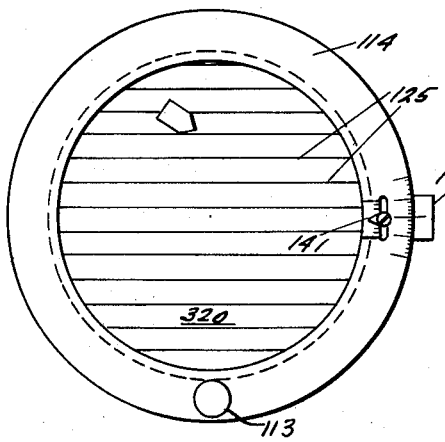
FIG. 7A.
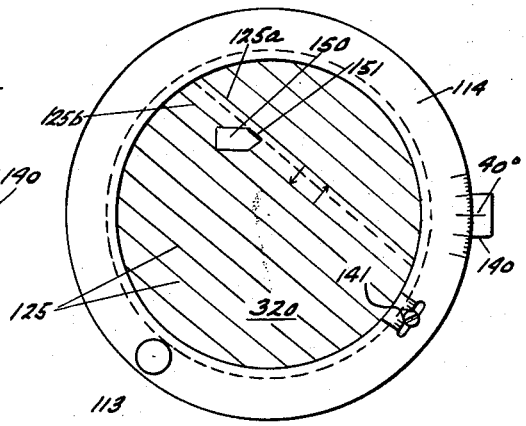
FIG. 7B.
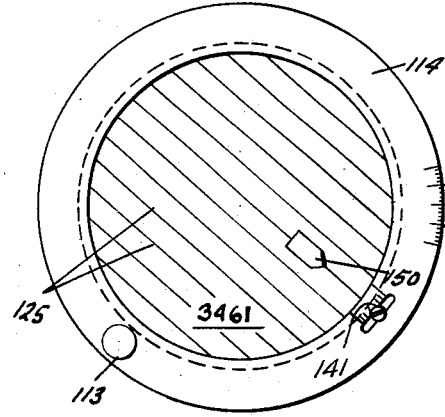
FIG. 8A.
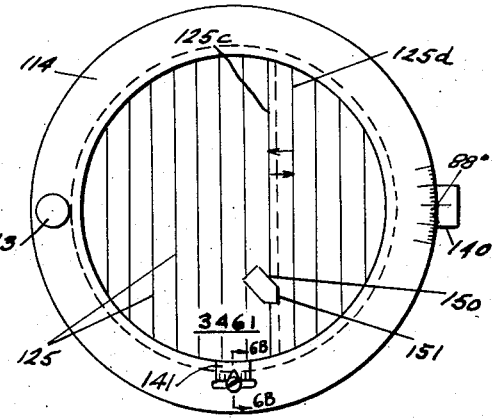
FIG. 8B.
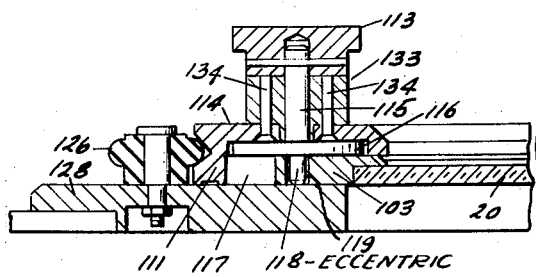
FIG. 5.
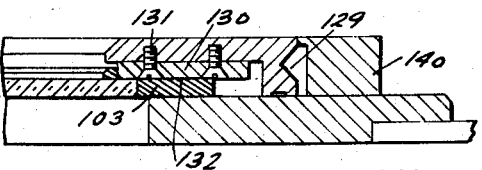
INVENTORS
ALBERT C. SUBACH
HOWARD B. BETTS
BY Ostrolenk, Faber,
Gerb & Soffen
ATTORNEYS United States Patent Office 2,937,447
Patented May 24, 1960

2,937,447
ANGLE MEASURING SCREEN
Albert C. Subach, New Hyde Park, and Howard B. Betts, Brooklyn, N.Y., assignors to Vanguard Instrument Corporation, Valley Stream, N.Y., a corporation of New York Filed Nov. 8, 1957, Ser. No. 695,462

13 Claims. (Cl. 33—1)

This invention relates generally to projectors used for the observation and measurement of images recorded on motion picture film, commonly referred to as a motion analyzer.

More particularly this invention relates to an improvement in the motion analyzer of co-pending application Serial No. 468,799, filed November 15, 1954, now Patent No. 2,922,333, assigned to the assignee of the instant invention, said improvement comprising means for accurately measuring the angular position of an object regardless of its position on the viewing screen.

The motion analyzer of co-pending application Serial No. 468,799 is utilized for making linear measurements on motion picture film which are to be correlated with time as indicated by frame count or timing marks on the film. The device of the aforesaid application includes (1) means for driving film single frame or continuously in either direction with accurate registration, (2) a coordinate crosshair system capable of accurately measuring relative distances on the projected image, (3) means for correcting background or image shift which may be due to causes inherent in the taking of the motion picture or in the movement of the subject matter, and (4) means for visual record of frame count. However, no means is included for measuring the angular position of the subject under study.

Essentially our angle meaesuring means comprises a translucent screen carried by a rotatable circular frame having angular graduation marks along the circumference thereof. A series of equally spaced parallel reference lines are etched or otherwise marked on the screen which is movable with respect to the frame in a direction perpendicular to the lengths of the reference lines for a distance equal to at least the spacing between reference lines.

When it is desired to compare the angular positions of an object as it appears on different selected film frames, the film is stopped with the first selected frame appearing on the screen. The frame is then rotated so that the reference lines are oriented approximately parallel to a convenient line on the object being viewed, i.e., the portion of a ship's side which appears straight. Then the screen is moved relative to the frame until any one of the reference lines coincides with the chosen line of the object. Further rotation of the frame and independent movement of the screen may be required to bring a reference line into coincidence with the chosen line. A first angular reading is then taken by reference to the graduation marks on the frame.

The film is then advanced until the second selected frame appears on the screen after which the rotation of the frame and independent movement of the screen are carried out in the manner hereinbefore explained until any one of the reference lines coincides with the same chosen line on the object being viewed. A second angular reading is then taken and compared with the first angular reading to obtain the change in angular position of the subject between the first and second selected frames.

Accordingly, it is a primary object of the instant invention to provide a novel motion analyzer including an angle measuring means.

Another object is to provide an angle measuring means which is operable without disturbing the coordinate measuring system or position of the viewed image relative to the crosshairs.

Still another object is to provide a rotatable angle measuring screen and means for measuring the angular position thereof.

A further object is to provide an angle measuring screen having a plurality of parallel reference lines and means for shifting said lines perpendicular to their own length.

These, as well as other, objects of our invention will become apparent from the following description of the accompanying drawings in which:

Figure 1 is a perspective view of a motion analyzer including our novel angle measuring means.

Figure 2 is a side elevation of the motion analyzer with the side of the housing cut away and schematically illustrates the light path from the light source to the point of final projection of the film.

Figure 3 is a view taken along the line 3—3 of Figure 2 looking in the direction of arrows 3—3.

Figure 4 is a front elevation of our novel angle measuring means.

Figure 5 is a section of the angle measuring screen taken through line 5—5 of Figure 3 looking in the direction of the arrows 5—5 with the screen rotated approximately 130° in a clockwise direction so that the adjusting knob is aligned with the section line.

Figure 6 is a rear elevation of the angle measuring means of Figure 4.

Figure 6A is a section taken along line 6A—6A of Figure 6 looking in the direction of arrows 6A—6A.

Figure 6B is a section illustrating the vernier details, taken along the line 6B—6B of Figure 8B looking in the direction of arrows 6B—6B.

Figures 7A, 7B, 8A and 8B are schematic illustrations of our novel angle measuring means illustrating the steps in the operation thereof.

Figure 9 is a plan view of the film feeding means.

Figure 10 is a view of the film feeding means taken along lines 10—10 of Figure 9, looking in the direction of the arrows, and illustrates the switching arrangement whereby the operator may select either continuous or single-frame advance of the film.

Figure 11 shows in detail the clutching arrangement whereby the shaft of the film feeding spool operates to meet the requirement of either feeding or taking up film depending upon the direction of film travel.

Figure 12 is an exploded view of the clutching arrangement shown in Figure 11.

Referring now to the drawings, and more particularly to Figures 1–3, Figure 1 illustrates an optical system which may be used in connection with our motion analyzer 100. The system comprises a projection lamp or other suitable light source 10, condenser 11 and mirror 12 contained within housing 13, condenser 17, mirror 18 and screen 20. The screen 20 is made of ground glass or other suitable translucent material.

The projection lamp 10, condenser 11 and mirror 12 are all contained within housing 13 which also contains the film feeding means fully described in co-pending application, the film being fed between reels 98, 99 through housing 13 at level 16. The balance of the apparatus is contained within housing 21. This includes reflecting mirror 18 which is secured to frame 15 and mounted on support 19 by gimbal rings 22. The gimbal rings allow for the universal tilting of the mirror so as to compensate for vertical and horizontal shift as film is advanced and observed. Rotational shift, on the other hand, is corrected for by rotating projection head 38 which turns on its optical axis 39. In this way the picture under study may be re-oriented when any type of background shift of the picture within the frame occurs. This is of particular value since the sequence of measurements is always relative to an assumed stationary background. The crosshair measuring system, which is also fully described in copending application Serial No. 468,799, is located at 24.

The light path is from light source 10 through aperture 14, condenser 11 and then from mirror 12 through the film 16, condenser 17, mirror 18 with the image finally being projected on translucent screen 20. Graduated markings, or orthogonal coordinates, may be permanently or removably attached to a stationary transparent member (not shown) positioned behind screen 20 which is secured in any manner suitable to housing 21 for convenient reading by the operator of the positions of crosshairs 35, 36.

Handwheels 48, 49 control the positions of crosshairs 35, 36, respectively, which are movable at right angles to one another and whose positions are indicated on scales 46, 47 respectively.

Figures 9 and 10 show the film advance mechanism which is employed in our novel motion analyzer. The film 50 at the focal plane 16 is being transported between reels or spools 51 or 52 under guide rollers 54 and 54a. Motion is imparted by a claw 53 rigidly attached to link 55. The claw 53 follows an approximate elliptical path as dictated by the eccentrically mounted pin 56 on shaft 57 and the seat 58 at pin 59. It is apparent that when shaft 57 is rotated clockwise, film will advance to the right as indicated by the arrows. Thus, clockwise rotation of shaft 57 causes link 55 and hence claw 53 to move to the right in its upward path. At the same time, friction segment 89 drives wheel 81 which, through the shaft and pulley arrangement hereinafter described drive take-up wheel 52. The counterclockwise rotation of take-up wheel 52 cooperates in pulling the film to the right. On the other hand, when shaft 57 rotates counterclockwise, it will advance the film to the left. The shaft is driven by a reversible electric motor 60 geared to produce one revolution at 57 in any desired time interval. Selection of the direction of film feed is made through a selector switch 62 which controls the direction of motor rotation.

Accurate registration is provided by the registration pin mount represented by leaf spring 70, the pin being at 71. This type of mounting completely eliminates any small amount of play or looseness inherent in the conventional system where sliding fits are used in moving the pin in and out of the film notches or sprocket holes 68. The pin 71 is rigidly fastened to the spring 70 and the spring is of sufficient thickness that no perceptible variation in the pin down position occurs as the pin is dropped successively into the film sprocket holes. In operation, the registration pin is cammed out of the film by arm 72 carried on link 55 which serves to operate both claw and pin in correct synchronism.

A single-frame feed cycle is initiated by depressing a momentary switch 63. As motion starts, the normally open switch 65 is closed and maintains power to drive motor 60 until one revolution occurs and link 55 returns and cams the switch open by pressing on button 67, thereby stopping the motor.

Thus, in moving the film in accurate registration, arm or link 55 mounted on crank pin 56 oscillates upon the rotation of the crank pin. This lifts up the finger or claw 53 in to a notch of the film and moves the film to the left or right depending on the direction of rotation of shaft 57. When the shaft is moved 180°, the arm 53 moves down again because the link moves down and the film has been transported one frame. The spring 70 with pin 71 moves down into a notch of the film to register it exactly. Consequently, the link 55 carries arm 72 which strikes the spring 70 at 75 and lifts the spring along with registration pin 71 up out of the film notch just before the arm 53 engages the film notch to move it.

In order to provide film take up, a friction segment 80 drives wheel 81 with its attached pulley 82. When motor 60 drives wheel 81, pulley 82 rotates freely on shaft 100. A spring type or other suitable belt 87 drives the pulley 83 with its attached pulley 84. Pulley 84 drives pulley 84a. These pulleys are connected to the spool shafts 85 and 85a in such a manner that the shaft may be made either driven or be made completely free from the driving pulleys 84 and 84a to automatically suit the requirement of feeding in either direction. This is done by a clutch arrangement which will now be described. The said clutch arrangement is applied to the shaft of reels or spools 51 and 52.

Referring now to Figures 9, 11 and 12, the ball clutch 90 therein illustrated instead of being conventionally controlled by relative motion between the shaft and ball, is controlled by relative motion between the assembly 84a–90 and the frame 92. The hardened steel ball 94 fits in pocket 95. When washer 96 turns relative to the pulley, the ball is cammed back and forth, by the lugs 98, engaging and disengaging the shaft. The lugs 98 fit into pocket 95 on each side of the ball. The washer 96 is actuated by contact with the frame 92 through pressure spring 98a. This arrangement allows the feed spool to be unwound at any speed required by the film radius at any given moment. This, of course, may be faster or slower than the rotational speed at pulleys 83 or 84. The camming surfaces 95 are so arranged that rotation of pulleys 82, 83, 84 and 84a drive the proper spool as the take-up reel. The automatic selection of which pulley is to be the driven take-up reel and which is the free-wheeling feed spool is dictated of course, on the direction of feed.

Provision for manual winding and searching is provided by a crank 101 at shaft 100. This shaft is longitudinally slidable and carries appropriate detents so that the wheel 81 may be disengaged from the segment 80, pulley 82 becomes locked to shaft 100 and simultaneously registration pin 71 is cammed out through a suitable lever. In this position the mechanism is ready for manual film feed in either direction, by drive thru pulleys 82, 83, 84 and 84a.

Observation of background shift may be accomplished by means of transparent markers (not shown) having cross lines at their tips, and being adjustable about stationary pins so as to coincide with some point in the picture background, at which position they are clamped in place. Such markers are also fully described in copending application Serial No. 468,799.

Referring more particularly to Figures 4–6B, screen 20 sits upon a depressed inner ledge 102 of ring shaped holder 103. Flat head screws 105, having their heads nested in countersunk clearance holes of clamps 104, project through these clearance holes and engage tapped holes in holder 103. Screen 20 is chamfered at three areas which complement the inclined surfaces of clamps 104 thereby retaining screen 20 to holder 103.

Threaded portions 109 of screws 108 mate with tapped holes in holder 103 to secure screen 20 to frame 111. Unthreaded portions 110 of screws 108 nest in guide slots 112 cut parallel to one another in frame 111. Nylon washers 112 are interposed between screw heads 108' and frame 111 and are effective in maintaining pressure to prevent slippage between frame 111 and screw 20, yet minimize wear when relative movement between these parts is intended.

Adjusting knob 113 is mounted for limited rotation with respect to frame 111 by being secured to one end of pivot 115, which extends through a clearance hole in member 133. One end of member 133 bears against surface 114 of frame 111 and is rigidly secured thereto by fastener 134. The other end of member 133 provides a platform atop which adjusting knob 113 is positioned. Disc 116 is secured to the other end of pivot 115 and nests within the cutout portion 117 of frame 111. Eccentric pin 118 projects from disc 116 into cam slot 119 cut in holder 103 and oriented at right angles to guide slots 122.

Thus, rotation of adjusting knob 113 about pivot 115 will cause movement of pin 118 in cam slot 119. Since pin 118 is eccentric to pivot 115, holder 103 will move relative to frame 111 with this movement being journaled by the cooperation of screws 108 and parallel guide slots 122. Guide lug 130, fastened by means of screws 131 to frame 111, extends into holder slot 132, which is parallel to guide slot 122, and cooperates therewith to further journal the movement of holder 103 relative to frame 111.

A plurality of equally spaced parallel reference lines 125 are etched or otherwise marked on screen 20. With screen 20 mounted to frame 111, reference lines 125 are positioned perpendicular to the longitudinal center lines of guide slots 122. Thus movement of holder 103 relative to frame 111 will cause reference lines 125 to move perpendicular to their own lengths. The distance between reference lines 125 is never greater than the distance between the two extreme positions of screen 20 relative to frame 111 and preferably slightly less than this distance for a reason to be hereinafter explained.

Pointer 141, movable with one of the screws 108 and guided by its associated slot 122, cooperates with scale 142 on frame 111 to provide an indication of the parallel travel of reference lines 125. Since the distance between reference lines 125 is known, this provides a convenient means for the rapid measurement of the distance between widely spaced objects on screen 20 without the necessity of operating the crosshair mechanism 24.

Frame 111 is guided for rotation about its own central axis by three nylon guide knobs 126 which are freely mounted on pivots 127 projecting from cover plate 128 of housing 21. Guide knobs 126 extend into circular guide slot 129 of V-shaped cross-section cut in the peripheral edge of frame 111, and position frame 111 so that cover plate opening 129 is entirely covered by the angle measuring assembly comprising frame 111 and screen 20 operatively mounted thereon.

Frame 111 carries graduation marks extending radially inward from the outer edge thereof, spaced at one degree intervals to form the main scale of an angular indicator. Vernier scale 140 is mounted to cover plate 128 and positioned adjacent to the peripheral edge of frame 111. Vernier scale 140 is constructed to provide accurate readings to one quarter of a degree. As illustrated, increasing angular readings are obtained by clockwise rotation of frame 111 with reference lines 125, when horizontal, being oriented in the 0° and 180° positions.

Figures 7A, 7B, 8A and 8B illustrate in simplified form the manner in which our novel angle measuring means is to be operated. Should it be desired to compare the angular positions of vessel 150 in frames 320 and 3461, the film is stopped with frame 320 appearing on screen 20 (Figure 7A). Adjusting knob 113 or member 133, upon which knob 113 rests, is grasped for rotation of frame 111 so that reference lines 125 are aligned parallel to a substantially straight line of vessel 150 (Figure 7B). Rotation of any one of the guide knobs 126 will serve as a means for the precision rotation frame 111.

In this case the chosen line 151 is accentuated for convenience. Then adjusting knob 113 is rotated until either reference line 125a or 125b coincides with chosen line 151. Further movement of frame 111 and reference lines 125 may be required until reference line 125a or 125b coincides with chosen line 151. For frame 320 the coincidence angle is read as 40°.

Next the film is advanced and then stopped, with frame 3461 appearing on screen 28 (Figure 8A). Adjusting knob 113 is grasped as before to rotate frame 111 so that reference lines 125 are substantially parallel to chosen line 151 (Figure 8B). Then adjusting knob 113 is rotated until reference line 125c or 125d coincides with chosen line 151. For frame 3461 the coincidence angle is read as 88°. Since the angular reading at frame 3461 is greater than the reading at frame 320, this indicates that the vessel has rotated clockwise as viewed on screen 20 through an angle of 48°.

By constructing cam slot 119 of sufficient width and positioning eccentric pin 118 far enough away from pivot 115, reference lines 125 travel at least the distance between reference lines when pin 118 is moved from one end of cam slot 119 to the center thereof. In this manner a reference line 125 may be brought into coincidence with a chosen line of the object under study no matter in what area of screen 20 this chosen line happens to fall.

While screen 20 has been described as being movable relative to frame 111 and reference lines 125 have been described as being marked on screen 20, it should be readily apparent to those skilled in the art that screen 20 may be stationary and reference lines 125 may comprise hairs strung across a framework which is movable with respect to frame 111 in a manner similar to the movement of holder 103.

In the foregoing we have described our invention only in connection with preferred embodiments thereof. Many variations and modifications of the principles of our invention within the scope of the description herein are obvious, and accordingly we prefer to be bound not by the specific disclosure herein but only by the appended claims.

We claim:

1. An angle measuring means being comprised of a rotatable ring-shaped frame, means defining a plurality of parallel spaced reference lines positioned in a first plane substantially parallel to the plane of rotation of said frame, said means being operatively secured to said frame for rotation of said reference lines in said first plane in unison therewith, and means for moving said reference lines in said first plane relative to said frame in a direction substantially perpendicular to the lengths of said reference lines for all angular positions of reference lines.

2. An angle measuring means being comprised of a rotatable ring-shaped frame, means defining a plurality of parallel spaced reference lines positioned in a first plane substantially parallel to the plane of rotation of said frame, said means being operatively secured to said frame for rotation of said reference lines in said first plane in unison therewith, and means for moving said reference lines in said first plane relative to said frame in a direction substantially perpendicular to the lengths of said reference lines for all angular positions of said reference lines, said last recited means being capable of moving said reference lines a distance equal to at least the spacing between the most widely spaced adjacent reference lines.

3. An angle measuring means being comprised of a rotatable ring-shaped frame, means defining a plurality of parallel spaced reference lines positioned in a first plane substantially parallel to the plane of rotation of said frame, said means being operatively secured to said frame for rotation of said reference lines in said first plane in unison therewith, and means for moving said reference lines in said first plane relative to said frame in a direction substantially perpendicular to the lengths of said reference lines for all angular positions of said reference lines, said reference lines being equally spaced from one another, said last recited means being capable of moving said reference lines for a distance equal to at least the spacing between adjacent reference lines.

4. An angle measuring means being comprised of a rotatable ring-shaped frame, means defining a plurality of parallel spaced reference lines positioned in a first plane substantially parallel to the plane of rotation of said frame, said means being operatively secured to said frame for rotation of said reference lines in said first plane in unison therewith, and means for moving said reference lines in said first plane relative to said frame in a direction substantially perpendicular to the lengths of said reference lines for all angular positions of said reference lines, said last recited means including an adjusting knob and a cam means operable by means of said adjusting knob, said adjusting knob being secured to said frame for rotation in unison therewith and limited rotation with respect thereto.

5. An angle measuring means being comprised of a rotatable ring-shaped frame, means defining a plurality of parallel spaced reference lines positioned in a first plane substantially parallel to the plane of rotation of said frame, said means being operatively secured to said frame for rotation of said reference lines in said first plane in unison therewith, and means for moving said reference lines in said first plane relative to said frame in a direction substantially perpendicular to the lengths of said reference lines for all angular positions of said reference lines, said frame having angular graduation marks extending radially inward from the outer edge thereof.

6. In a motion analyzer, an angle measuring means being comprised of a ring-shaped frame, a ring-shaped holder, and means defining a plurality of reference lines; said means being rigidly secured to said holder with said reference lines being disposed in spaced parallel relationship; said holder being slidably mounted on said frame for movement with respect thereto in a direction perpendicular to the lengths of said plurality of reference lines for all angular positions of said reference lines.

7. In a motion analyzer, an angle measuring means being comprised of a ring-shaped frame, a plate, a ring-shaped holder, and means defining a plurality of reference lines; said means being rigidly secured to said holder with said reference lines being disposed in spaced parallel relationship; said holder being slidably mounted to said frame for movement with respect thereto in a direction perpendicular to the lengths of said plurality of reference lines for all angular positions of said reference lines; said frame being rotatably mounted on said plate and positioned to overlie an opening in said plate; said holder being rotatable in unison with said frame.

8. In a motion analyzer, an angle measuring means being comprised of a ring-shaped frame, a plate, a ring-shaped holder, and means defining a plurality of reference lines; said means being rigidly secured to said holder with said reference lines being disposed in spaced parallel relationship; said holder being slidably mounted on said frame for movement with respect thereto in a direction perpendicular to the lengths of said plurality of reference lines for all angular positions of said reference lines; a plurality of guide knobs rotatably secured to said plate and entered into a circular notch cut in the peripheral edge of said frame; said plurality of guide knobs securing said frame to said plate in rotatable relationship therewith; said holder being rotatable in unison with said frame.

9. In a motion analyzer, an angle measuring means being comprised of a ring-shaped frame, a ring-shaped holder, and means defining a plurality of reference lines; said means being rigidly secured to said holder with said reference lines being disposed in spaced parallel relationship; said holder being slidably mounted to said frame for movement with respect thereto in a direction perpendicular to the lengths of said plurality of reference lines; a cam slot and a pin entered therein for all angular positions of said reference lines; said cam slot being cut in one of said holder or said frame; said pin carried by the other of said holder or said frame; an adjusting knob being mounted on a pivot rotatably mounted to said frame; said pin being eccentric to said pivot; said pivot being in fixed relationship to the one of said cam slot and said pin which is carried by said frame.

10. In a motion analyzer, an angle measuring means being comprised of a ring-shaped frame, a ring-shaped holder, and means defining a plurality of reference lines; said means being rigidly secured to said holder with said reference lines being disposed in spaced parallel relationship, said holder being slidably mounted on said frame for movement with respect thereto in a direction perpendicular to the lengths of said plurality of reference lines for all angular positions of said reference lines; said frame having at least one guide means positioned perpendicular to said plurality of reference lines; said guide means cooperating with means secured to said holder for journaling the movement of said holder relative to said frame.

11. In a motion analyzer, an angle measuring means being comprised of a translucent screen and a frame; said screen having a plurality of parallel reference lines marked thereon; said frame being rotatable with respect to the housing of said motion analyzer; said screen being operatively mounted to said frame for rotation in unison therewith and for slidable movement with respect thereto in a direction perpendicular to the lengths of said reference lines for all angular positions of said reference lines.

12. An apparatus for the measurement and observation of images projected from a film, said apparatus being comprised of an optical system for the projection of said image, a housing wherein said optical system is disposed, film feeding means, and means for determining the angular position of an object of said image; said latter means including a frame and a translucent screen whereon said image is projected; said screen having a plurality of parallel reference lines marked thereon; said frame being rotatably mounted on said housing; said screen being operatively mounted on said frame for rotation in unison therewith and for slidable movement with respect thereto in a direction perpendicular to the lengths of said reference lines for all angular positions of said reference lines; said film feeding means being constructed and positioned to transport film, wherefrom said images are derived, in operative relationship with respect to said optical system.

13. An angle measuring means being comprised of a rotatable ring-shaped frame, means defining a plurality of parallel spaced reference lines positioned in a first plane substantially parallel to the plane of rotation of said frame, said means being operatively secured to said frame for rotation of said reference lines in said first plane in unison therewith, and means for moving said reference lines in said first plane relative to said frame in a direction substantially perpendicular to the lengths of said reference lines for all angular positions of said reference lines; said frame being rotatable for at least 360° in a plane parallel to said first plane.

References Cited in the file of this patent

UNITED STATES PATENTS 2,284,558    Buechle et al.    May 26, 1942

FOREIGN PATENTS 122,488    Sweden    Aug. 17, 1948